United States Patent
Reinoso Garcia et al.

(10) Patent No.: US 11,560,537 B2
(45) Date of Patent: Jan. 24, 2023

(54) CONTAINER COMPRISING A DETERGENT COMPOSITION CONTAINING SALTS OF MGDA AND GLDA

(71) Applicant: BASF SE, Ludwigshafen am Rhein (DE)

(72) Inventors: Marta Reinoso Garcia, Ludwigshafen (DE); Verena Mormul, Ludwigshafen (DE); Thomas Schmidt, Ludwigshafen (DE); Jeremy T Manning, Wyandotte, MI (US)

(73) Assignee: BASF SE, Ludwigshafen (DE)

( * ) Notice: Subject to any disclaimer, the term of this patent is extended or adjusted under 35 U.S.C. 154(b) by 35 days.

(21) Appl. No.: 16/607,259

(22) PCT Filed: Apr. 16, 2018

(86) PCT No.: PCT/EP2018/059670
§ 371 (c)(1),
(2) Date: Oct. 22, 2019

(87) PCT Pub. No.: WO2018/197249
PCT Pub. Date: Nov. 1, 2018

(65) Prior Publication Data
US 2020/0299624 A1     Sep. 24, 2020

(30) Foreign Application Priority Data
Apr. 27, 2017  (EP) .................................. 17168459

(51) Int. Cl.
| | | |
|---|---|---|
| C11D 3/26 | (2006.01) | |
| C11D 3/33 | (2006.01) | |
| C11D 17/04 | (2006.01) | |
| B29D 22/00 | (2006.01) | |
| B65B 53/02 | (2006.01) | |
| B65D 65/46 | (2006.01) | |
| B65D 75/00 | (2006.01) | |
| C11D 3/39 | (2006.01) | |
| C11D 11/00 | (2006.01) | |
| C11D 7/32 | (2006.01) | |
| B29K 29/00 | (2006.01) | |

(52) U.S. Cl.
CPC .......... C11D 17/045 (2013.01); B29D 22/003 (2013.01); B65B 53/02 (2013.01); B65D 65/46 (2013.01); B65D 75/00 (2013.01); C11D 3/33 (2013.01); C11D 3/3942 (2013.01); C11D 7/3245 (2013.01); C11D 11/0017 (2013.01); C11D 11/0023 (2013.01); C11D 17/043 (2013.01); C11D 17/044 (2013.01); B29K 2029/04 (2013.01)

(58) Field of Classification Search
CPC ....... C11D 3/33; C11D 3/3942; C11D 7/3245; C11D 17/043; C11D 17/045
USPC ................ 510/477, 488, 499, 375, 296, 439
See application file for complete search history.

(56) References Cited

U.S. PATENT DOCUMENTS

| | | | |
|---|---|---|---|
| 2016/0130531 A1* | 5/2016 | Biel ..................... | C11D 3/3409 510/434 |
| 2016/0145545 A1 | 5/2016 | Letzelter et al. | |
| 2016/0145546 A1 | 5/2016 | Letzelter et al. | |
| 2017/0029750 A1 | 2/2017 | Letzelter et al. | |
| 2018/0002643 A1 | 1/2018 | Reinoso Garcia et al. | |

FOREIGN PATENT DOCUMENTS

| | | |
|---|---|---|
| DE | 198 19 187 A1 | 11/1999 |
| EP | 0 851 023 A2 | 7/1998 |
| EP | 3 026 103 A1 | 6/2016 |
| EP | 3 124 587 A1 | 2/2017 |
| RU | 2015155965 A | 7/2017 |
| WO | WO 02/42400 A2 | 5/2002 |
| WO | WO 03/084836 A1 | 10/2003 |
| WO | WO 2009/112994 A1 | 9/2009 |
| WO | WO 2011/072017 A2 | 6/2011 |
| WO | WO 2016/058872 A1 | 4/2016 |
| WO | WO 2016/058888 A1 | 4/2016 |
| WO | WO 2016/083253 A1 | 6/2016 |
| WO | WO 2016/124516 A1 | 8/2016 |

OTHER PUBLICATIONS

Extended European Search Report dated Nov. 7, 2017 in Patent Application No. 17168459.0.
International Search Report dated Jun. 21, 2018 in PCT/EP2018/059670 filed on Apr. 16, 2018.
International Preliminary Report on Patentability dated Jul. 12, 2019 in PCT/EP2018/059670 filed on Apr. 16, 2018 (with Letter).

* cited by examiner

Primary Examiner — Gregory R Delcotto
(74) Attorney, Agent, or Firm — ArentFox Schiff LLP

(57) ABSTRACT

The present application is related to a container made of a polymer and containing a single unit dose of a detergent composition. The detergent composition contains at least two complexing agents (A) dissolved in an aqueous medium. The complexing agents (A) are (A1) at least one alkali metal salt of methyl glycine diacetic acid (MGDA), and (A2) at least one alkali metal salt of glutamic acid diacetic acid (GLDA). The complexing agents (A1) and (A2) are partially neutralized with alkali and the weight ratio of (A1) and (A2) ranges from 1:9 to 9:1. The aqueous medium contains at least 25% by weight of water relative to the entire liquid phase.

15 Claims, No Drawings

CONTAINER COMPRISING A DETERGENT COMPOSITION CONTAINING SALTS OF MGDA AND GLDA

The present invention is directed towards a container comprising a single unit dose of a detergent composition containing at least two complexing agents (A) dissolved in an aqueous medium, said complexing agents (A) being
(A1) at least one alkali metal salt of methyl glycine diacetic acid (MGDA), and
(A2) at least one alkali metal salt of glutamic acid diacetic acid (GLDA),
the weight ratio of (A1) and (A2) being in the range of from 1:9 to 9:1,
wherein said container is made from a polymer, and wherein such aqueous medium comprises at least 25% by weight of water, referring to the entire liquid phase,
wherein the amount of optically inactive impurities is in the range of from 0.1 to 5% by weight, referring to complexing agent (A), and
wherein complexing agents (A1) and (A2) are partially neutralized with alkali.

Complexing agents such as methyl glycine diacetic acid (MGDA) and their respective alkali metal salts are useful and environmentally friendly sequestrants for alkaline earth metal ions such as $Ca^{2+}$ and $Mg^{2+}$. They can replace phosphate-type sequestrants such as sodium tripolyphosphate ("STPP"), the latter being replaced now in many countries for environmental reasons. Therefore, MGDA and related compounds are recommended and used for various purposes such as laundry detergents and for automatic dishwashing (ADW) formulations, in particular for so-called phosphate-free laundry detergents and phosphate-free ADW formulations. For shipping such complexing agents, in most cases solids such as granules are applied or aqueous solutions.

For automatic dishwashing and laundry care, so-called single unit doses are of increased commercial importance. They are of great convenience for the end-user because such unit doses contain the right amounts of the ingredients for the washing and rinsing steps and because they can be easily placed into the automatic dishwasher or washing machine by the end-user, see, e.g., WO 2002/042400 and WO 2011/072017. Examples of unit doses are tablets and pellets and in particular pouches. Pouches in the form of multi-compartment pouches have been disclosed as well, see WO 2009/112994.

However, especially in the presence of bleaching agents on the basis of inorganic peroxides, sometimes shortcomings can be observed. Especially on long-time storing such as several months in summer, yellowing or even formation of brownish stains in the detergent compositions can be observed. Such coloring is commercially unattractive because it may suggest that the quality of the respective detergent composition may have deteriorated.

A way to avoid this shortcoming is to provide detergent compositions in containers that comprise several compartments. One compartment contains a bleaching agent and another one comprises oxidation-sensitive ingredients such as enzymes. Compartments that are removed during a washing circle can be made from polymer films, see, e.g., WO 2003/084836. Water in combinations with such films is of disadvantage, however, because it may damage said films upon storage. MGDA solutions can be provided with up to 40% by weight of MGDA at ambient temperature. Higher concentrations are not feasible. Instead, precipitation and crystallization of MGDA can be observed.

However, it is desirable that the sequestrant is provided to the washing liquor at an early stage of the wash circle. With sequestering agents such as solid MGDA, this does not work under all conditions. In WO 2016/058888, polymer containers such as pouches have been disclosed that contain certain enantiomerically enriched MGDA-salt solutions. In WO 2016/058872, polymer containers such as pouches have been disclosed that contain certain enantiomerically enriched GLDA-salt solutions.

It has been observed, though, that, in some instances, strongly alkaline MGDA and alkaline GLDA solutions are capable of damaging polymer surfaces that lead to a reduced shelf life of such containers. Highly concentrated GLDA solutions may exhibit an unfavorably high viscosity.

It was therefore an objective of the present invention to provide a detergent composition, especially in unit dose form, that can overcome the drawbacks explained above. It was also an objective of the present invention to provide a method of manufacturing detergent compositions that can overcome the drawbacks explained above. It was further an objective to provide an element for a detergent composition that can overcome the above drawbacks, and a method for making such an element.

Accordingly, the containers comprising a single unit dose as defined at the outset have been found. They are hereinafter also defined as containers according to the (present) invention or as inventive containers comprising a single unit dose or as inventive containers.

The inventive container is in the form of a unit dose. In the context of the present invention, the term "unit dose" refers to amounts of detergent compositions that are designed for one wash in a laundry machine or one dishwash in an automatic dishwashing machine. A unit dose may be designed for home care applications or for industrial or institutional applications, such as—but not limited to—in hospitals, canteens, restaurants, hotels, youth hostels or a commercial laundry. Preferably, unit doses in the context of the present invention are designed for home care applications. Unit doses may also be defined as single unit doses, both terms being used interchangeably in the context of the present invention.

Inventive containers comprising a single unit dose may be applied in various applications, especially for automatic dishwash or laundry applications. Depending on the application the detergent composition may contain different components besides complexing agents (A), and depending on the desired application the size may differ. It is preferred that inventive containers that are used in home care are smaller in size than inventive containers to be used in industrial or institutional applications, and it is preferred that containers used in automatic dishwash applications are smaller in size than inventive containers used in laundry cleaning applications.

In one embodiment of the present invention, inventive containers comprising a single unit dose encompass a single compartment in which all components of the respective detergent composition. In a preferred embodiment, inventive containers encompass two or more compartments, for example two, three or four compartments.

In one embodiment of the present invention inventive containers are in the form of a box with one or more compartments or in the form of a sachet with one or more compartments or in the form of a pouch with one or more compartments or in the form of a combination of a box and one or more pouches, especially in the form of the combination of a box and one pouch. In such a combination of a box and a pouch may be connected to each other, e.g., by gluing them together. A pouch with two compartments may also be referred to as two-chamber pouch. A pouch with a single compartment may also be referred to as one-chamber pouch. Thus, in particular embodiments, containers according to the present invention may be in the form of a two-chamber pouch or in the form of a combination of a box and a one-chamber pouch.

Said container may be mechanically flexible or stiff. The distinction between mechanically flexible and mechanically stiff may be made by manual determination of the degree of deformability by an average end user with two fingers. If such an average end user can deform the shape of said container by at least 5% into one dimension the respective container is deemed mechanically flexible, otherwise it is deemed stiff.

In specific embodiments, inventive containers are tablets that have at least one cavity per tablet. Per cavity there is at least one pouch, preferably there is at least one pouch placed into the cavity and attached to the tablet. In special embodiment, the volume of the pouch including the solution of complexing agents (A) corresponds to the volume of the cavity, for example they may have the same volume ±10%, preferably ±5%. The better shape and size of cavity and the pouch including the solution of complexing agents (A) correspond to each other the less breakage during transport can be observed. Such tablets may be packaged in a film of, e.g., polyvinyl alcohol. The tablet comprises components of the respective detergent composition such as surfactants, builder(s), enzymes, and/or bleaching agent.

In another specific embodiment, inventive containers are a box that has at least one cavity per box. Per cavity there is at least one pouch, preferably there is at least one pouch placed into the cavity and attached to the box. In special embodiment, the volume of the pouch including the solution of complexing agents (A) corresponds to the volume of the cavity, for example they may have the same volume ±10%, preferably ±5%. The better shape and size of cavity and the pouch including the solution of complexing agents (A) correspond to each other the less breakage during transport can be observed. The box comprises components of the respective detergent composition such as surfactants, builder(s), enzymes, and/or bleaching agent.

In another specific embodiment, inventive containers are pouches that encompass at least two compartments, for example two, three or four compartments. One of the compartments contains the solution of complexing agents (A). The other components of the respective detergent compositions are in the one or more other compartment(s).

In one embodiment of the present invention, all complexing agents (A) that are comprised in inventive containers is in the very compartment in dissolved form. In another embodiment of the present invention, a share of complexing agents (A) is comprised in one compartment in dissolved form, as stated above, and more of complexing agents (A) is comprised in the other compartment or one other compartment, as applicable, of the inventive container.

Solid detergent compositions may contain residual moisture. Residual moisture refers to water other than the water that is part of the aqueous medium in which complexing agents (A) are dissolved in. In one embodiment of the present invention, the residual moisture content is in the range of from 0.1 to 10% by weight, referring to the total respective detergent composition. The residual moisture content can be determined, e. g., by Karl-Fischer-Titration or by measuring the weight loss upon drying.

In the context with the present invention, the term "pouch" refers to a container made from a flexible film. Said container is essentially closed upon storage of the respective dishwashing detergent composition. During the dishwashing process the contents of the pouch are removed from the pouch itself, preferably by dissolving the pouch.

Containers and especially pouches in the context of the present invention may have various shapes. For examples, containers may be in the form of a ball, an ellipsoid, a cube, a cuboid, or they may be of geometrically irregular shape. In special examples, pouches may have the shape of an envelope, of a pillow, of a flexible sleeve or flexible tube that is closed at both ends, of a ball or a cube.

In one embodiment of the present invention, containers according to the present invention and especially pouches have a diameter in the range of from 0.5 to 7 cm.

In one embodiment of the present invention, containers according to the present invention and especially pouches have a volume—in the closed state—in the range of from 15 to 70 ml, preferably 18 ml to 50 ml and in particular 20 to 30 ml. Such inventive containers are particularly useful for automatic dishwash in home care application. Inventive containers particularly useful for fabric care in home care applications may have a volume in the range of from 15 to 40 ml, preferably 25 to 30 ml.

In one embodiment of the present invention, each compartment has a content in the range of from 0.5 to 50 ml, preferably 5 to 25 ml. In embodiments wherein inventive containers encompass two or more compartments, such compartments may have equal size or different size. Preferably, in embodiments wherein inventive containers encompass two or more compartments, such containers encompass one major compartment and one or two or three smaller compartments.

Inventive containers are made from a polymer, preferably from a water-soluble polymer. Pouches in the context of the present invention are made from a polymer film.

Said polymer may be selected from natural polymers, modified natural polymers, and synthetic polymers. Examples of suitable natural polymers are alginates, especially sodium alginate, furthermore xanthum, carragum, dextrin, maltodextrin, gelatine, starch, and pectin. Examples of suitable modified natural polymers are methylcellulose, ethylcellulose, carboxymethyl cellulose, hydroxypropylcellulose, hydroxypropyl methyl cellulose (HPMC), and hydroxymethyl cellulose.

Examples of suitable synthetic polymers are polyvinyl pyrrolidone, polyacrylamide, polyalkylene glycols, preferably polypropylene glycol and polyethylene glycol, especially polyethylene glycol with a molecular weight $M_w$ in the range of at least 2,000 g/mol, preferably of from 3,000 to 100,000 g/mol, and in particular polyvinyl alcohol.

The term "polyvinyl alcohol" as used herein does not only include homopolymers of polyvinyl alcohol that can be made by free-radical polymerization of vinyl acetate followed by subsequent hydrolysis (saponification) of all or the vast majority of the ester groups. Polyvinyl alcohol also includes copolymers obtainable by free-radical copolymerization of vinyl acetate and at least one comonomer selected from maleic acid, maleic anhydride, itaconic anhydride, methyl (meth)acrylate and 2-acrylamido-2-methyl propanesulfonic acid ("AMPS").

In a preferred embodiment of the present invention, polyvinyl alcohol as used for making containers and especially pouches has an average degree of polymerization (weight average) in the range of from 500 to 3,000. The molecular weight $M_w$ of such polyvinyl alcohol is preferably, in the range of from 6,000 to 250,000 g/mol, preferably up to 75,000 g/mol. The molecular weight is preferably determined by gel permeation chromatography of the respective polyvinyl acetate or respective copolymer before saponification.

Preferably, polyvinyl alcohol used for making containers and especially pouches is atactic as determined by $^1$H NMR spectroscopy.

Polyvinyl alcohols used for making containers—especially pouches—essentially have repeating units of ($CH_2$—CHOH). The hydroxyl groups in polyvinyl alcohol are mostly in 1,3-position, thus forming structural units of the type —$CH_2$—CH(OH)—$CH_2$—CH(OH)—. In minor amounts (1 to 2 mole-%) there are geminal hydroxyl groups, thus forming structural units of —$CH_2$—CH(OH)—CH(OH)—$CH_2$—.

One or more modified polyvinyl alcohols may be employed as polymers instead of polyvinyl alcohol or in combination with polyethylene glycol or with polyvinyl alcohol. Examples are graft copolymers such as polyalkylene glycol grafted with polyvinyl acetate followed by subsequent hydrolysis/saponification of the ester groups.

Polymer may be used without or with one or more additives. Suitable additives are especially plasticizers such as $C_4$-$C_{10}$-dicarboxylic acids, for example adipic acid, and glycols such as ethylene glycol and diethylene glycol.

Due to their production, commercially available polyvinyl alcohols usually have residual nonsaponified ester groups, especially acetate groups. Polyvinyl alcohols used for making containers and especially pouches for embodiments of the present invention essentially have a degree of saponification in the range of from 87 to 89 mole-%. The degree of saponification can be determined in accordance with the determination of the ester value, for example according to DIN EN ISO 3681 (2007-10).

In one embodiment of the present invention, polyvinyl alcohols used for making containers and especially for making pouches for embodiments of the present invention have a glass transition temperature in the range of from 55 to 60° C., preferably 58° C., determinable according to, e.g., DIN 53765: 1994-03, or ISO 11357-2: 1999-03.

In one embodiment of the present invention, polyvinyl alcohols used for making inventive containers and especially for making pouches for embodiments of the present invention have a melting point in the range of from 185 to 187° C.

In one embodiment of the present invention, polyvinyl alcohols used for making for embodiments of the present invention and especially for making pouches comprising a single unit dose are partially acetalized or ketalized with sugars such as, glucose, fructose, or with starch. In another embodiment of the present invention polyvinyl alcohols used for making containers and especially pouches are partially esterified with, e. g., maleic acid or itaconic acid.

In one embodiment of the present invention, polyvinyl alcohol films may contain a plasticizer. Plasticizers may be used for reducing the stiffness of such polyvinyl alcohol films. Suitable compounds usable as plasticizers for polyvinyl alcohol are ethylene glycol, diethylene glycol, triethylene glycol, polyethylene glycol, for example with an average molecular weight $M_w$ up to 400 g/mol, glycerol, trimethylol propane, triethanolamine, and neo-pentyl glycol. Up to 25% by weight of the respective polyvinyl alcohol may be plasticizer.

In one embodiment of the present invention, said pouches are made from a polymer film, said polymer being water-soluble at a temperature of at least 40° C., for example in the range of from 40 to 95° C., but insoluble in water at a temperature in the range of from 5 to 30° C. In other embodiments, said pouches are made from polymer films that are soluble in water even at 1° C. In the context of the present invention, the terms water-soluble and soluble in water are used interchangeably. They both refer to polymers that dissolve in water at 20° C., methods of determination being discussed below. However, such polymers dissolve much slower or not detectably at all in the aqueous medium containing complexing agents (A). A polymer is deemed water-soluble if the percentage of solubility is at least 90%. A suitable method of determination of the percentage is disclosed below.

Examples of polymer films that are soluble at 1° C. or more and in particular of polymer films that are soluble at at least 40° C. are polyvinyl alcohol films available from Syntana E. Harke GmbH & Co under the trademark of Solublon®.

In one embodiment of the present invention, polymer films and preferably polyvinyl alcohol films used for making pouches that can be used in the present invention have a thickness (strength) in the range of from 10 to 100 µm, preferably 20 to 90 µm, even more preferably 25 to 35 µm. If the strength of polymer films and especially of polyvinyl alcohol films exceeds 100 µm it takes too long to dissolve them during the washing cycle. If the strength of polymer films and especially of polyvinyl alcohol films is below 10 µm they are too sensitive to mechanical stress.

In one embodiment of the present invention, the solution containing complexing agents (A) contains at least one dyestuff. Examples of dyestuffs are Acid Red 1, Acid Red 52, Acid Blue 9, Acid Yellow 3, Acid Yellow 23, Acid Yellow 73, Acid Green 1, Solvent Green 7, and Acid Green 25. In other embodiments, the solutions containing complexing agents (A) additionally contain a pigment formulation, for example a formulation of CI Pigment Yellow 101 or CI Pigment Blue 15:1.

In one embodiment of the present invention, the solution containing complexing agents (A) contains at least one complexing agent other than MGDA and GLDA. Examples are citric acid and its respective alkali metal salts and aminopolycarboxylates and their respective alkali metal salts such as iminodisuccinic acid ("IDS") and IDS-$Na_4$. In other embodiments, the solution containing complexing agents (A) does not contain any complexing agent other than MGDA and GLDA.

In one embodiment of the present invention, the solution containing complexing agents (A) contains at least one viscosity modifying agent, for example one thickening agent. Examples of thickening agents are agar-agar, carragene, tragacanth, gum arabic, alginates, pectins, hydroxyethyl cellulose, hydroxypropyl cellulose, starch, gelatin, locust bean gum, cross-linked poly(meth)acrylates, for example polyacrylic acid cross-linked with methylene bis-(meth)acrylamide, furthermore silicic acid, clay such as—but not limited to—montmorrilionite, zeolite, and furthermore dextrin and casein.

In a preferred embodiment of the present invention, said container and preferably such pouch contain neither peroxide nor enzyme. Such preferred embodiments usually have a longer shelf-life.

Containers and in particular pouches may be colorless. In other embodiments, they may be colored. For decorative or advertisement purposes, pictures, logos or writings may be printed on them.

The expression aqueous medium as used herein refers to a medium that is liquid or gel-type at ambient temperature and that contains at least 25% by weight of water, referring to the entire liquid phase—thus, without the MGDA and without the GLDA. In one embodiment of the present invention said aqueous medium contains at least one organic solvent miscible with water, such as, but not limited to ethylene glycol, 1,2-propylene glycol, diethylene glycol, triethylene glycol, N,N-diethanolamine, N,N-diisopropanolamine, and N-methyl N,N-diethanolamine. In other embodiments, said aqueous medium does not contain any organic solvent.

The term ammonium salts as used in the present invention refers to salts with at least one cation that bears a nitrogen atom that is permanently or temporarily quaternized. Examples of cations that bear at least one nitrogen atom that is permanently quaternized include tetramethylammonium, tetraethylammonium, dimethyldiethyl ammonium, and n-$C_{10}$-$C_{20}$-alkyl trimethyl ammonium. Examples of cations that bear at least one nitrogen atom that is temporarily quaternized include protonated amines and ammonia, such as monomethyl ammonium, dimethyl ammonium, trimethyl ammonium, monoethyl ammonium, diethyl ammonium, triethyl ammonium, n-$C_{10}$-$C_{20}$-alkyl dimethyl ammonium 2-hydroxyethylammonium, bis(2-hydroxyethyl) ammonium, tris(2-hydroxyethyl)ammonium, N-methyl 2-hydroxyethyl ammonium, N,N-dimethyl-2-hydroxyethylammonium, and especially $NH_4^+$.

For the naked eye, solutions such as aqueous solutions do not contain precipitates. Aqueous solutions in the context of the present invention may contain some organic solvent, for example 0.1 to 20% by volume, referring to the entire liquid phase. In a preferred embodiment, aqueous solutions do not contain significant amounts of organic solvent.

The liquid phase may also comprise one or more inorganic salts dissolved in the liquid phase, for example alkali metal hydroxide, alkali metal carbonate, alkali metal sulfate or alkali metal halide or a combination of at least two of the foregoing.

In one embodiment of the present invention, such aqueous solution containing complexing agents (A) has a pH value in the range of from 8.7 to 11.3, preferably 9.0 to 10.8. The pH value is determined at ambient temperature.

In a preferred embodiment of the present invention, aqueous solutions containing complexing agents (A) have a total solids contents in the range of from 40 to 75%, preferred are 45 to 65% and more preferred 48 to 60% by weight.

Said complexing agents (A) are
(A1) at least one alkali metal salt of methyl glycine diacetic acid (MGDA), and
(A2) at least one alkali metal salt of glutamic acid diacetic acid (GLDA),
wherein complexing agents (A1) and (A2) are both partially neutralized with alkali.

The term alkali refers to alkali metal cations, same or different, for example cations of lithium, sodium, potassium, rubidium, cesium, and combinations of at least two of the foregoing. Preferred examples of alkali metal cations are sodium and potassium and combinations of sodium and potassium.

Partially neutralized with alkali refers to the equivalents of alkali metal cations but not to ammonium ions in relation to the carboxyl groups of MGDA and GLDA.

In a preferred embodiment,
(A1) is at least one alkali metal salt of methyl glycine diacetic acid (MGDA), with an average of more than two and less than three of the carboxyl groups being neutralized with alkali, hereinafter also referred to as complexing agent (A1) or simply as (A1), and (A2) is at least one alkali metal salt of L- and D-enantiomers of glutamic acid diacetic acid (GLDA) or of enantiomerically pure L-GLDA, with an average of more than three of the carboxyl groups being neutralized with alkali, preferably an average of more than three and less than four of the carboxyl groups are neutralized with alkali, hereinafter altogether also referred to as complexing agent (A2) or simply as (A2).

The term carboxyl groups in the above definition refers to carboxyl groups per molecule.

Complexing agents (A1) are selected from compounds according to general formula (I)

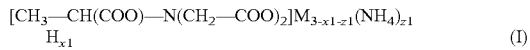

wherein
M is selected from alkali metal cations, same or different, for example cations of lithium, sodium, potassium, rubidium, cesium, and combinations of at least two of the foregoing. Preferred examples of alkali metal cations are sodium and potassium and combinations of sodium and potassium.

The variable x1 in formula (I) may be in the range of from zero to 1.0, preferred are 0.01 to 0.5. In particularly preferred embodiments, x1 is from 0.1 to 0.3.

The variable z1 in formula (I) may be in the range of from zero to 1.0, preferred are 0.0005 to 0.5.

However, the sum of x1+z1 in formula (I) is greater than zero, for example 0.05 to 0.6.

Examples of $M_{3-x1-z1}(NH_4)_{z1}H_{x1}$ are $Na_{3-x1}H_{x1}$, $[Na_{0.7}(NH_4)_{0.3}]_{3-x1}H_{x1}$, $[(NH_4)_{0.7}Na_{0.3}]_{3-x1}H_{x1}$, $(K_{0.7}Na_{0.3})_{3-x1}H_{x1}$, $(Na_{0.7}K_{0.3})_{3-x}H_x$, $(K_{0.22}Na_{0.78})_{3-x1}H_{x1}$, $(Na_{0.22}K_{0.78})_{3-x1}H_{x1}$, and $K_{3-x1}H_{x1}$. Preferred examples of $M_{3-x1}(NH_4)_{z1}H_{x1}$ are selected from $Na_{3-x1}H_{x1}$, $(K_{0.85}Na_{0.15})_{3-x1}H_{x1}$, and $(Na_{0.85}K_{0.15})_{3-x1}H_{x1}$.

In one embodiment of the present invention, complexing agent (A1) is selected from at least one alkali metal salt of racemic MGDA and from alkali metal salts of mixtures of L- and D-enantiomers according to formula (I), said mixture containing predominantly the respective L-isomer with an enantiomeric excess (ee) in the range of from 5 to 99%, preferably 5 to 95%, more preferably from 10 to 75% and even more preferably from 10 to 66%.

In one embodiment of the present invention, the total degree of alkali neutralization of (A1) and (A2) is in the range of from 0.80 to 0.98 mol-%, preferred are 0.90 to 0.97%. The total degree of alkali neutralization does not take into account any neutralization with ammonium.

Complexing agents (A2) are selected from compounds according to general formula (II)

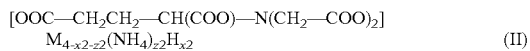

wherein
M is selected from alkali metal cations, same or different, as defined above, The variable x2 in formula (II) may be in the range of from zero to 2.0, preferred are 0.02 to 0.5. In particularly preferred embodiments, x2 is from 0.1 to 0.3.

The variable z2 in formula (II) may be in the range of from zero to 1.0, preferred are 0.0005 to 0.5.

However, the sum of x2+z2 in formula (II) is preferably greater than zero, for example 0.05 to 0.6.

Examples of $M_{4-x2-z2}(NH_4)_{z2}H_{x2}$ are $Na_{4-x2}H_{x2}$, $[Na_{0.7}(NH_4)_{0.3}]_{4-x2}H_{x2}$, $[(NH_4)_{0.7}Na_{0.3}]_{4-x2}H_{x2}$, $(K_{0.7}Na_{0.3})_{4-x2}H_{x2}$, $(Na_{0.7}K_{0.3})_{4-x2}H_{x2}$, $(K_{0.22}Na_{0.78})_{4-x2}H_{x2}$, $(Na_{0.22}K_{0.78})_{4-x2}H_{x2}$, and $K_{4-x2}H_{x2}$. Preferred examples of $M_{4-x}H_x$ are selected from $Na_{4-x2}H_{x2}$, $(K_{0.85}Na_{0.15})_{4-x2}H_{x2}$, and $(Na_{0.85}K_{0.15})_{4-x2}H_{x2}$.

In a preferred embodiment of the present invention, M is the same for (A1) and (A2). In embodiments wherein combinations of different alkali metals are employed the ratio of such different alkali metal cations is preferably the same for both MGDA and GLDA.

Specifically, complexing agent (A2) is selected from at least one alkali metal salt of a mixture of L- and D-enantiomers according to formula (II), said mixture containing the racemic mixture or preferably predominantly the respective L-isomer, for example with an enantiomeric excess (ee) in the range of from 5 to 99%, preferably 5 to 95%.

The enantiomeric excess of MGDA and of its salts may be determined by measuring the polarization (polarimetry) or preferably by chromatography, for example by HPLC with a chiral column, for example with one or more cyclodextrins as immobilized phase or with a ligand exchange (Pirkle-brush) concept chiral stationary phase. Preferred is determination of the ee by HPLC with an immobilized optically active amine such as D-penicillamine in the presence of copper(II) salt. The enantiomeric excess of GLDA and of its salts may be determined by measuring the polarization (polarimetry).

Alkali metal salts of complexing agents (A) contain one or more impurities that may result from the synthesis of the respective complexing agents (A). In the cases of (A1) and (A2), such impurities may be propionic acid, formic acid, glycolic acid, lactic acid, glutamate, alanine, nitrilotriacetic acid (NTA) or the like and their respective alkali metal salts. Such impurities are usually present in minor amounts or may be added deliberately. A higher amount is to be avoided. "Minor amounts" in this context refer to a total of 0.1 to 5% by weight, referring to alkali metal salt of complexing agent (A), preferably up to 2.5% by weight.

In one embodiment of the present invention, the weight ratio of (A1) to (A2) or their respective salts in the mixture is in the range of from 1:9 to 9:1, preferably 1:3 to 3:1, more preferably 2:3 to 3:2. The weight ratio may be determined, for example, by chromatographic methods such as HPLC.

In embodiments where two or more compounds of general formula (I) are present, the ee refers to the enantiomeric excess of all L-isomers present in the respective mixture compared to all D-isomers. For example, in cases wherein a mixture of the di- and trisodium salt of MGDA is present, the ee refers to the sum of the disodium salt and trisodium salt of L-MGDA with respect to the sum of the disodium salt and the trisodium salt of D-MGDA.

In one embodiment of the present invention, complexing agents (A) may contain in the range of from 0.1 to 10% by weight of one or more optically inactive impurities, at least one of the impurities being selected from iminodiacetic acid, formic acid, glycolic acid, propionic acid, acetic acid and their respective alkali metal or mono-, di- or triammonium salts. In one embodiment of the present invention, inventive mixtures may contain less than 0.2% by weight of nitrilotriacetic acid (NTA), preferably 0.01 to 0.1% by weight. The percentages refer to total complexing agents (A).

In one embodiment of the present invention, complexing agents (A) may contain in the range of from 0.1 to 10% by weight of one or more optically active impurities, at least one of the impurities being selected from L-carboxymethylalanine and its respective mono- or dialkali metal salts, L-carboxymethylglutamic acid and its respective di- or trialkali metal salts, and optically active mono- or diamides that result from an incomplete saponification during the synthesis of complexing agents (A). Preferably, the amount of optically active impurities is in the range of from 0.2 to 10% by weight, referring to the sum of complexing agents (A). Even more preferably, the amount of optically active impurities is in the range of from 1 to 7% by weight.

In one embodiment of the present invention, complexing agents (A) may contain minor amounts of cations other than alkali metal or ammonium. It is thus possible that minor amounts, such as 0.01 to 5 mol-% of total complexing agent, based on anion, bear alkali earth metal cations such as $Mg^{2+}$ or $Ca^{2+}$, or transition metal ions such as $Fe^{2+}$ or $Fe^{3+}$ cations.

In one embodiment of the present invention, the aqueous medium contains in the range of from 35 to 75% by weight of complexing agents (A), preferably 40 to 70% by weight, more preferably 45 to 70% by weight and even more preferably 48 to 65% by weight.

Aqueous medium refers to media in which the solvent is essentially water. In one embodiment, in such aqueous medium water is the sole solvent. In other embodiments, mixtures of water with one or more water-miscible solvents are used as aqueous medium. The term water-miscible solvent refers to organic solvents that are miscible with water at ambient temperature without phase-separation. Examples are ethylene glycol, 1,2-propylene glycol, isopropanol, and diethylene glycol. Preferably, at least 50% by volume of the respective aqueous medium is water, referring to the solvent.

In one embodiment of the present invention, the aqueous medium containing complexing agents (A) contains at least one inorganic basic salt selected from alkali metal carbonates. Preferred examples are sodium carbonate, potassium carbonate, for example 0.1 to 1.5% by weight.

Detergent compositions comprised in inventive containers may be gel-type, liquid-type, or essentially solid. Gel-type inventive compositions may be provided as moulds. Liquid-type inventive compositions may be provided in a container having at least two compartments, one compartment containing dissolved complexing agents (A) and a second compartment containing at least one component of the dishwashing detergent composition other than complexing agents (A), such as, but not limited to a surfactant or a combination of surfactants, an enzyme or a combination of enzymes, a bleaching agent, a bleach catalyst, or a builder other than complexing agents (A).

In accordance with the above description, detergent compositions comprised in inventive containers contain ingredients other than complexing agents (A). Examples of ingredients other than complexing agents (A) are surfactants or a combination of surfactants, one or more enzymes, a bleaching agent, a bleach catalyst, or a builder other than complexing agents (A).

Detergent compositions comprised in inventive containers may contain one or more complexing agent other than MGDA and GLDA. Examples for complexing agent other than MGDA and GLDA are citrate, phosphonic acid derivatives, for example the disodium salt of hydroxyethane-1,1-diphosphonic acid ("HEDP"), for example trisodium citrate, and phosphates such as STPP (sodium tripolyphosphate). Due to the fact that phosphates raise environmental concerns, it is preferred that detergent compositions comprised in inventive containers are free from phosphate. "Free from phosphate" is to be understood in the context of the present invention as meaning that the content of phosphate and polyphosphate is in sum in the range from 10 ppm to 0.2% by weight, determined by gravimetric analysis and referring to the total detergent composition.

Detergent compositions comprised in inventive containers may contain one or more surfactant, preferably one or more non-ionic surfactant.

Preferred non-ionic surfactants are alkoxylated alcohols, di- and multiblock copolymers of ethylene oxide and propylene oxide and reaction products of sorbitan with ethylene oxide or propylene oxide, alkyl polyglycosides (APG), hydroxyalkyl mixed ethers and amine oxides.

Preferred examples of alkoxylated alcohols and alkoxylated fatty alcohols are, for example, compounds of the general formula (III)

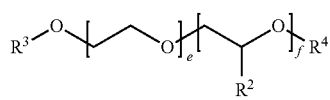
(III)

in which the variables are defined as follows:
$R^2$ is identical or different and selected from hydrogen and linear $C_1$-$C_{10}$-alkyl, preferably in each case identical and ethyl and particularly preferably hydrogen or methyl,
$R^3$ is selected from $C_8$-$C_{22}$-alkyl, branched or linear, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
$R^4$ is selected from $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl.

The variables e and f are in the range from zero to 300, where the sum of e and f is at least one, preferably in the range of from 3 to 50. Preferably, e is in the range from 1 to 100 and f is in the range from 0 to 30.

In one embodiment, compounds of the general formula (III) may be block copolymers or random copolymers, preference being given to block copolymers.

Other preferred examples of alkoxylated alcohols are, for example, compounds of the general formula (IV)

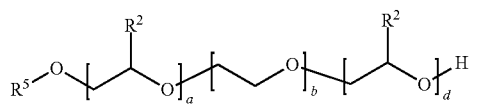
(IV)

in which the variables are defined as follows:
$R^2$ is identical or different and selected from hydrogen and linear $C_1$-$C_{10}$-alkyl, preferably identical in each case and ethyl and particularly preferably hydrogen or methyl,
$R^5$ is selected from $C_6$-$C_{20}$-alkyl, branched or linear, in particular n-$C_8H_{17}$, n-$C_{10}H_{21}$, n-$C_{12}H_{25}$, n-$C_{13}H_{27}$, n-$C_{15}H_{31}$, n-$C_{14}H_{29}$, n-$C_{16}H_{33}$, n-$C_{18}H_{37}$,
a is a number in the range from zero to 10, preferably from 1 to 6,
b is a number in the range from 1 to 80, preferably from 4 to 20,
d is a number in the range from zero to 50, preferably 4 to 25.

The sum a+b+d is preferably in the range of from 5 to 100, even more preferably in the range of from 9 to 50.

Preferred examples for hydroxyalkyl mixed ethers are compounds of the general formula (V)

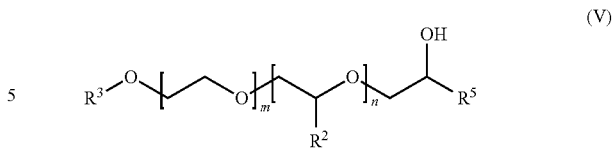
(V)

in which the variables are defined as follows:
$R^2$ is identical or different and selected from hydrogen and linear $C_1$-$C_{10}$-alkyl, preferably in each case identical and ethyl and particularly preferably hydrogen or methyl,
$R^3$ is selected from $C_8$-$C_{22}$-alkyl, branched or linear, for example iso-$C_{11}H_{23}$, iso-$C_{13}H_{27}$, n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
$R^4$ is selected from $C_1$-$C_{18}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, isodecyl, n-dodecyl, n-tetradecyl, n-hexadecyl, and n-octadecyl.

The variables m and n are in the range from zero to 300, where the sum of n and m is at least one, preferably in the range of from 5 to 50. Preferably, m is in the range from 1 to 100 and n is in the range from 0 to 30.

Compounds of the general formula (IV) and (V) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides or alkyl polyglycosides, especially linear $C_4$-$C_{16}$-alkyl polyglucosides and branched $C_8$-$C_{14}$-alkyl polyglycosides such as compounds of general average formula (VI) are likewise suitable.

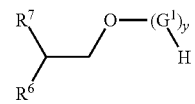
(VI)

wherein:
$R^6$ is $C_1$-$C_4$-alkyl, in particular ethyl, n-propyl or isopropyl,
$R^7$ is —$(CH_2)_2$—$R^6$,
$G^1$ is selected from monosaccharides with 4 to 6 carbon atoms, especially from glucose and xylose,
y in the range of from 1.1 to 4, y being an average number,
Further examples of non-ionic surfactants are compounds of general formula (VII) and (VIII)

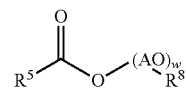
(VII)

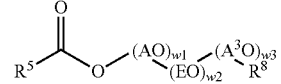
(VIII)

AO is selected from ethylene oxide, propylene oxide and butylene oxide,
EO is ethylene oxide, $CH_2CH_2$—O, $R^8$ selected from $C_8$-$C_{18}$-alkyl, branched or linear, and $R^5$ is defined as above.

$A^3O$ is selected from propylene oxide and butylene oxide, w is a number in the range of from 15 to 70, preferably 30 to 50, w1 and w3 are numbers in the range of from 1 to 5, and w2 is a number in the range of from 13 to 35.

An overview of suitable further nonionic surfactants can be found in EP-A 0 851 023 and in DE-A 198 19 187.

Mixtures of two or more different nonionic surfactants may also be present.

Other surfactants that may be present are selected from amphoteric (zwitterionic) surfactants and anionic surfactants and mixtures thereof.

Examples of amphoteric surfactants are those that bear a positive and a negative charge in the same molecule under use conditions. Preferred examples of amphoteric surfactants are so-called betaine-surfactants. Many examples of betaine-surfactants bear one quaternized nitrogen atom and one carboxylic acid group per molecule. A particularly preferred example of amphoteric surfactants is cocamidopropyl betaine (lauramidopropyl betaine).

Examples of amine oxide surfactants are compounds of the general formula (IX)

$$R^9R^{10}R^{11}N\rightarrow O \qquad (IX)$$

wherein $R^9$, $R^{10}$, and $R^{11}$ are selected independently from each other from aliphatic, cycloaliphatic or $C_2$-$C_4$-alkylene $C_{10}$-$C_{20}$-alkylamido moieties. Preferably, $R^9$ is selected from $C_8$-$C_{20}$-alkyl or $C_2$-$C_4$-alkylene $C_{10}$-$C_{20}$-alkylamido and $R^{10}$ and $R^{11}$ are both methyl.

A particularly preferred example is lauryl dimethyl aminoxide, sometimes also called lauramine oxide. A further particularly preferred example is cocamidylpropyl dimethylaminoxide, sometimes also called cocamidopropylamine oxide.

Examples of suitable anionic surfactants are alkali metal and ammonium salts of $C_8$-$C_{18}$-alkyl sulfates, of $C_8$-$C_{18}$-fatty alcohol polyether sulfates, of sulfuric acid half-esters of ethoxylated $C_4$-$C_{12}$-alkylphenols (ethoxylation: 1 to 50 mol of ethylene oxide/mol), $C_{12}$-$C_{18}$ sulfo fatty acid alkyl esters, for example of $C_{12}$-$C_{18}$ sulfo fatty acid methyl esters, furthermore of $C_{12}$-$C_{18}$-alkylsulfonic acids and of $C_{10}$-$C_{18}$-alkylarylsulfonic acids. Preference is given to the alkali metal salts of the aforementioned compounds, particularly preferably the sodium salts.

Further examples for suitable anionic surfactants are soaps, for example the sodium or potassium salts of stearic acid, oleic acid, palmitic acid, ether carboxylates, and alkylether phosphates.

In one embodiment of the present invention, detergent compositions comprised in inventive containers may contain 0.1 to 60% by weight of at least one surfactant, selected from anionic surfactants, amphoteric surfactants and amine oxide surfactants.

In a preferred embodiment, detergent compositions comprised in inventive containers do not contain any anionic surfactant.

Detergent compositions comprised in inventive containers may contain at least one bleaching agent, also referred to as bleach. Bleaching agents may be selected from chlorine bleach and peroxide bleach, and peroxide bleach may be selected from inorganic peroxide bleach and organic peroxide bleach. Preferred are inorganic peroxide bleaches, selected from alkali metal percarbonate, alkali metal perborate and alkali metal persulfate.

Examples of organic peroxide bleaches are organic percarboxylic acids, especially organic percarboxylic acids.

In inventive solid detergent compositions, alkali metal percarbonates, especially sodium percarbonates, are preferably used in coated form. Such coatings may be of organic or inorganic nature. Examples are glycerol, sodium sulfate, silicate, sodium carbonate, and combinations of at least two of the foregoing, for example combinations of sodium carbonate and sodium sulfate.

Suitable chlorine-containing bleaches are, for example, 1,3-dichloro-5,5-dimethylhydantoin, N-chlorosulfamide, chloramine T, chloramine B, sodium hypochlorite, calcium hypochlorite, magnesium hypochlorite, potassium hypochlorite, potassium dichloroisocyanurate and sodium dichloroisocyanurate.

Detergent compositions comprised in inventive containers compositions may comprise, for example, in the range from 3 to 10% by weight of chlorine-containing bleach.

Detergent compositions comprised in inventive containers may comprise one or more bleach catalysts. Bleach catalysts can be selected from bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Detergent compositions comprised in inventive containers may comprise one or more bleach activators, for example N-methylmorpholinium-acetonitrile salts ("MMA salts"), trimethylammonium acetonitrile salts, N-acylimides such as, for example, N-nonanoylsuccinimide, 1,5-diacetyl-2,2-dioxohexahydro-1,3,5-triazine ("DADHT") or nitrile quats (trimethylammonium acetonitrile salts).

Further examples of suitable bleach activators are tetraacetylethylenediamine (TAED) and tetraacetylhexylenediamine.

Detergent compositions comprised in inventive containers may comprise one or more corrosion inhibitors. In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment of the present invention, detergent compositions comprised in inventive containers comprise in total in the range from 0.1 to 1.5% by weight of corrosion inhibitor.

Detergent compositions comprised in inventive containers may comprise one or more builders, selected from organic and inorganic builders. Examples of suitable inorganic builders are sodium sulfate or sodium carbonate or silicates, in particular sodium disilicate and sodium metasilicate, zeolites, sheet silicates, in particular those of the formula $\alpha$-$Na_2Si_2O_5$, $\beta$-$Na_2Si_2O_5$, and $\delta$-$Na_2Si_2O_5$, also fatty acid sulfonates, $\alpha$-hydroxypropionic acid, alkali metal malonates, fatty acid sulfonates, alkyl and alkenyl disuccinates, tartaric acid diacetate, tartaric acid monoacetate, oxidized starch, and polymeric builders, for example polycarboxylates and polyaspartic acid.

Examples of organic builders are especially polymers and copolymers. In one embodiment of the present invention, organic builders are selected from polycarboxylates, for example alkali metal salts of (meth)acrylic acid homopolymers or (meth)acrylic acid copolymers.

Suitable comonomers are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 2000 to 10 000 g/mol, in particular 3000 to 8000 g/mol. Also of suitability are copolymeric polycarboxylates, in particular those of acrylic acid with methacrylic acid and of acrylic acid or methacrylic acid with maleic acid and/or fumaric acid, and in the same range of molecular weight.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilic or hydrophobic monomer as listed below.

Suitable hydrophobic monomers are, for example, isobutene, diisobutene, butene, pentene, hexene and styrene, olefins with 10 or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-α-olefin, a mixture of $C_{20}$-$C_{24}$-α-olefins and polyisobutene having on average 12 to 100 carbon atoms per molecule.

Suitable hydrophilic monomers are monomers with sulfonate or phosphonate groups, and also nonionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth) acrylate. Polyalkylene glycols here may comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, a llyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethyl-methacrylamide, and salts of said acids, such as sodium, potassium or ammonium salts thereof.

Particularly preferred phosphonate-group-containing monomers are vinylphosphonic acid and its salts.

A further example of builders is carboxymethyl inulin.

Moreover, amphoteric polymers can also be used as builders.

Detergent compositions comprised in inventive containers may comprise, for example, in the range from in total 10 to 70% by weight, preferably up to 50% by weight, of builder. In the context of the present invention, neither MGDA nor GLDA are counted as builder.

In one embodiment of the present invention, such detergent compositions comprised in inventive containers may comprise one or more cobuilders.

Detergent compositions comprised in inventive containers may comprise one or more antifoams, selected for example from silicone oils and paraffin oils. In one embodiment of the present invention, detergent compositions comprised in inventive containers compositions comprise in total in the range from 0.05 to 0.5% by weight of antifoam.

Detergent compositions comprised in inventive containers may comprise one or more enzymes. Examples of enzymes are lipases, hydrolases, amylases, proteases, cellulases, esterases, pectinases, lactases and peroxidases.

In one embodiment of the present invention, detergent compositions comprised in inventive containers may comprise, for example, up to 5% by weight of enzyme, preference being given to 0.1 to 3% by weight. Said enzyme may be stabilized, for example with the sodium salt of at least one $C_1$-$C_3$-carboxylic acid or $C_4$-$C_{10}$-dicarboxylic acid. Preferred are formates, acetates, adipates, and succinates.

In one embodiment of the present invention, detergent compositions comprised in inventive containers comprise at least one zinc salt. Zinc salts can be selected from water-soluble and water-insoluble zinc salts. In this connection, within the context of the present invention, water-insoluble is used to refer to those zinc salts which, in distilled water at 25° C., have a solubility of 0.1 g/l or less. Zinc salts which have a higher solubility in water are accordingly referred to within the context of the present invention as water-soluble zinc salts.

In one embodiment of the present invention, zinc salt is selected from zinc benzoate, zinc gluconate, zinc lactate, zinc formate, $ZnCl_2$, $ZnSO_4$, zinc acetate, zinc citrate, $Zn(NO_3)_2$, $Zn(CH_3SO_3)_2$ and zinc gallate, preferably $ZnCl_2$, $ZnSO_4$, zinc acetate, zinc citrate, $Zn(NO_3)_2$, $Zn(CH_3SO_3)_2$ and zinc gallate.

In another embodiment of the present invention, zinc salt is selected from ZnO, ZnO.aq, $Zn(OH)_2$ and $ZnCO_3$. Preference is given to ZnO.aq.

In one embodiment of the present invention, zinc salt is selected from zinc oxides with an average particle diameter (weight-average) in the range from 10 nm to 100 μm.

The cation in zinc salt can be present in complexed form, for example complexed with ammonia ligands or water ligands, and in particular be present in hydrated form. To simplify the notation, within the context of the present invention, ligands are generally omitted if they are water ligands.

Detergent compositions comprised in inventive containers have numerous advantages. They exhibit good cleaning properties in automatic dishwashing applications. They show a good storage and shelf-life behaviour and a low tendency to colorization and especially yellowing.

Another aspect of the present invention is directed towards the use of inventive containers for dishwashing or laundry cleaning. Dishwashing and laundry cleaning may refer to home care or to industrial and institutional applications, home care applications being preferred. Particularly preferred is automatic dishwash in home care applications.

Another aspect of the present invention is directed towards a process for making inventive containers comprising a single unit dose, said process also being referred to as inventive process.

Another aspect of the present invention is directed towards a process for making a compartment of a container according to the present invention, hereinafter also being referred to as inventive process. The inventive process comprises several steps, hereinafter also being referred to as steps (a) to (e), and said steps briefly being summarized as follows:
(a) providing a polymer,
(b) shaping the polymer in a way that it has at least one recess so it can contain a liquid,
(c) providing at least two complexing agents (A) dissolved in an aqueous medium, said complexing agents being at least one complexing agent (A1) and at least one complexing agent (A2),
the weight ratio of (A1) and (A2) being in the range of from 1:9 to 9:1, both (A1) and (A2) partially neutralized with alkali,
(d) placing said aqueous medium containing complexing agents (A) according to step (c) into the formed recess according to step (b),
(e) closing the open container or a compartment, respectively.

In a preferred embodiment, the container is a pouch made from a polymer film. Preferably, the polymer is polyvinyl alcohol. Steps (a) to (e) are described hereinafter in more detail.

Step (a) refers to providing a polymer, preferably a polymer film and even more preferably a film from polyvinyl alcohol.

In embodiments wherein the container or its respective compartment is different from a pouch, such polymer may have a different thickness compared to films, preferably a greater thickness. It may be in the form of granules, and step (b)—shaping the polymer—may be performed, for example, by injection molding.

In a preferred embodiment of the present invention, polymer films and preferably polyvinyl alcohol films used for making pouches for inventive compositions have a thickness (strength) in the range of from 10 to 100 µm, preferably 20 to 90 µm, even more preferably 25 to 40 µm. If the strength of polymer films and especially of polyvinyl alcohol films exceeds 100 µm it takes too long to dissolve them during the washing cycle. If the strength of polymer films and especially of polyvinyl alcohol films is below 10 µm they are too sensitive to mechanical stress.

In step (b), the polymer—preferably, the polymer film—is shaped in a way that it has at least one recess so it can contain a liquid. Examples are thermoforming processes, especially at a temperature of 5 to 20° C. below the melting point of the respective polymer.

In embodiments wherein said container is a pouch the shaping may be performed through shaping in shaping a hose and cutting the hose into shorter pieces and closing one side each, thereby shaping sachets.

In special embodiments of the inventive process, step (b) is performed with the aid of a forming die having at least one cavity, preferably with a plurality of cavities. Such cavities may have apertures (holes) through which reduced pressure ("vacuum") may be applied. In such special embodiments, a polymer film is placed of the die. The polymer is then heated through a heating device. The polymer filmed is simultaneously shaped by the application of a vacuum for example through apertures of the cavity/the cavities.

In addition to applying the vacuum, it is possible to blow air or an inert gas against the polymer film in order to force it into intimate contact with the die.

In step (c), at least two complexing agents (A) dissolved in an aqueous medium is provided. A way to make such solutions of complexing agents (A) is described below.

Although it is possible to mix the respective compounds (A1) and (A2) or even the different enantiomers, for example as aqueous solutions, such method is not preferred since the synthesis of D-MGDA and D-GLDA is tedious. It is preferred to start with an aqueous solution of a mixture from L-alanine and alkali metal L-glutamate, especially sodium L-glutamate monohydrate, partially neutralized, to react the mixture with hydrocyanic acid and formaldehyde in the sense of a double Strecker synthesis and to then saponify the nitrile groups under conditions under which a partial racemization occurs with respect to MGDA and a partial racemization occurs with respect to GLDA.

An aqueous solution of partially neutralized L-alanine and L-glutamic acid may be made by mixing aqueous solutions of L-alanine and of L-glutamic acid, or by mixing solid L-alanine and L-glutamic acid and dissolving said mixture in water or in aqueous alkali metal hydroxide solution, or by mixing solid L-alanine and L-monosodium glutamate hydrate and dissolving said mixture in water or in aqueous alkali metal hydroxide solution.

Subsequently, a double Strecker synthesis is carried out, step (c1), by treating the above aqueous solution with formaldehyde and hydrocyanic acid or alkali metal cyanide. The double Strecker synthesis can be carried out by adding alkali metal cyanide or a mixture from hydrocyanic acid and alkali metal cyanide or preferably hydrocyanic acid and formaldehyde to the aqueous solution. Alternatively, the aqueous solution of the amino acids and/or their respective salts is first treated with formaldehyde to obtain the corresponding Schiff's base followed by addition of hydrocyanic acid. Said addition of formaldehyde and alkali metal cyanide or preferably hydrocyanic acid can be performed in one or more portions. Formaldehyde can be added as gas or as formalin solution or as paraformaldehyde. Preferred is the addition of formaldehyde as 30 to 35% by weight aqueous solution.

In a particular embodiment of the present invention, step (c1) is carried out at a temperature in the range of from 5 to 80° C., preferably from 10 to 50° C.

In one embodiment of the present invention, step (c1) is carried out at a constant temperature in the above range. In another embodiment, step (c1) is carried out using a temperature profile, for example by starting the reaction at 15° C. and allowing then stirring the reaction mixture at 25° C.

In one embodiment of the present invention, step (c1) is carried out at elevated pressure, for example 1.01 to 6 bar. In another embodiment, step (c1) is carried out at normal pressure (1 bar).

In one embodiment of the present invention, step (c1) is carried out at a constant pH value, and a base or an acid is added in order to keep the pH value constant. Preferably, however, the pH value during step (c1) is decreasing, and neither base nor acid other than, optionally, HCN is added. In such embodiments, at the end of step (c1), the pH value may have dropped to 2 to 4.5.

In one embodiment of the present invention, step (c1) is carried out by adding 1.9 to 2.5 equivalents based on moles of amine groups of HCN, preferably 1.9 to 2.3, more preferably 1.9 to 2.1.

In one embodiment of the present invention, step (c1) is out by adding 1.9 to 2.5 equivalents based on moles of amine groups of formaldehyde, preferably 1.9 to 2.3, more preferably 1.9 to 2.1.

Step (c1) can be performed in any type of reaction vessel that allows the handling of hydrocyanic acid. Useful are, for example, flasks, stirred tank reactors and cascades of two or more stirred tank reactors.

From step (c1), an aqueous solution of the L- and/or D-enantiomer of the following two dinitriles of formula (B1)

and formula (B2) and their corresponding alkali metal salts are obtained, briefly also referred to as dinitriles (B1) and (B2) or alkali metal salt of dinitrile (B1) and (B2), respectively.

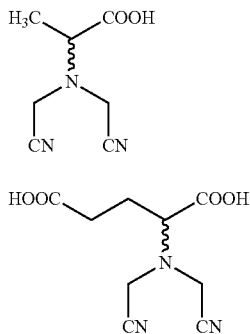

In a preferred embodiment of step (c2), the dinitriles resulting from step (c1) are hydrolysed, preferably saponified in two steps (c2.1) and (c2.2), at different temperatures. In another preferred embodiment stoichiometric amounts of hydroxide or an amount of 0.8 to 0.98 moles of hydroxide per molar sum of COOH groups and nitrile groups of dinitrile of step (c1), preferably 0.9 to 0.97 moles, are employed.

Different temperature means in the context of step (c2) that the average temperature of step (c2.1) is different from the average temperature of step (c2.2). Preferably, step (c2.1) is performed at a temperature lower than step (c2.2). Even more preferably, step (c2.2) is performed at an average temperature that is at least 80 K higher than the average temperature of step (c2.1). Hydroxide in the context of step (c2) refers to alkali metal hydroxide, preferably potassium hydroxide or combinations of sodium hydroxide and potassium hydroxide and even more preferably to sodium hydroxide.

Step (c2.1) can be started by adding the solution resulting from step (c1) to an aqueous solution of alkali metal hydroxide or adding an aqueous solution of alkali metal hydroxide to a solution resulting from step (c1). In another embodiment, the solution resulting from step (c1) and an aqueous solution of alkali metal hydroxide are added simultaneously to a vessel.

When calculating the stoichiometric amounts of hydroxide to be added in step (c2), the sum of COOH groups and nitrile groups from the total theoretical amount of dinitriles (B1) and (B2) is calculated and the amounts of alkali already present from the at least partial neutralization of amino acids before the dinitrile formation and, optionally, step (c1), is subtracted.

Step (c2.1) can be performed at a temperature in the range of from 10 to 80° C., preferable 30 to 65° C. In the context of step (c2.1) "temperature" refers to the average temperature.

As a result of step (c2.1), an aqueous solution of the respective diamides and their respective alkali metal salts can be obtained, M being alkali metal. Said solution may also contain corresponding monoamides and/or its mono-, di-, or tri-alkali metal salt.

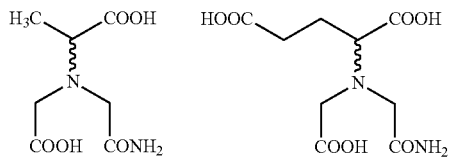 [SMILES: CC(C(=O)O)N(CC(N)=O)CC(=O)O ; NC(=O)CN(CC(=O)O)C(CCC(=O)O)C(=O)O]

Step (c2.2) can be performed at a temperature in the range of from 90 to 195° C., preferably 160 to 195° C. In the context of step (c2.2) "temperature" refers to the average temperature.

In one embodiment of the present invention, step (02.2) has an average residence time in the range of from 15 to 360 minutes.

In preferred embodiments the higher range of the temperature interval of step (c2.2) such as 190 to 195° C. is combined with a short residence time such as 15 to 25 minutes, or the lower range of the temperature interval of step (c2.2) such as 90° C. to 110° C. is combined with a longer residence time such as 200 to 360 minutes, or a middle temperature such as 185° C. is combined with a middle residence time such as 20 to 45 minutes.

Step (c2.2) can be performed in the same reactor as step (c2.1), or—in the case of a continuous process—in a different reactor.

Depending on the degree of under-stoichiometric hydroxide use, minor or major impurities of alkali salts of the above amides may be present in the solutions of complexing agents (A).

Depending on the type of reactor in which step (c2.2) is performed, such as an ideal plug flow reactor, the average residence time can be replaced by the residence time.

In one embodiment of the present invention, step (c2.1) is carried out in a continuous stirred tank reactor and step (c2.2) is carried out in a second continuous stirred tank reactor. In a preferred embodiment, step (c2.1) is carried out in a continuous stirred tank reactor or in a cascade of at least two continuous stirred tank reactors, and step (c2.2) is carried out in a plug flow reactor, such as a tubular reactor.

In one embodiment of the present invention, step (c2.1) is carried out at elevated pressure, for example at 1.05 to 6 bar. In another embodiment, step (c2.1 is carried out at normal pressure.

Especially in embodiments wherein step (c2.2) is carried out in a plug flow reactor, step (c2.2) may be carried out at elevated pressure such as 1.5 to 40 bar, preferably at least 20 bar. The elevated pressure may be accomplished with the help of a pump or by autogenic pressure elevation.

Preferably, the pressure conditions of steps (c2.1) and (c2.2) are combined in the way that step (c2.2) is carried out at a higher pressure than step (c2.1).

During step (c2.2), a partial racemization takes place. Without wishing to be bound by any theory, it is likely that racemization takes place on the stage of the above L-diamides or of L-MGDA resp. L-GLDA.

In one embodiment of the present invention, the manufacture of complexing agents (A1) and (A2) may comprise steps other than the steps (c1) and (c2) disclosed above. Such additional steps may be, for example, one or more decolourization steps, for example with activated carbon or with peroxide such as $H_2O_2$, or by UV irradiation or combinations of at least two of the foregoing.

An aqueous solution is obtained that contains at least one complexing agent (A1) and at least one complexing agent (A2), the weight ratio of complexing agent (A1) and complexing agent (A2) being in the range of from 1:9 to 9:1.

After the above synthesis, the solution of complexing agents (A) so obtained may be worked up, for example, by performing one or more purification steps. Suitable purification steps are ammonia stripping, treatment with charcoal and bleaching with peroxide.

Solutions of complexing agents (A) are obtained. Depending on the concentration in which complexing agents (A) is to be applied, the synthesis may be followed by one or more concentration steps wherein water is removed, for example by evaporation.

In step (d) of the inventive process, aqueous medium containing complexing agents (A) so obtained is then placed into the recesses obtained in step (b). Step (d) can be performed by applying pressure or simply using gravity. Applying pressure is preferred. In embodiments wherein a die with a plurality of cavities has been used, it is preferred to simultaneously place aqueous medium containing complexing agents (A) into more than one recess.

In one embodiment, the recesses are filled completely. In other embodiments, the recesses are only filled partially, for example 50 to 90% by volume, the latter embodiment being preferred in order to prevent spilling of aqueous medium in step (e) to follow.

In step (e) of the inventive process, the filled but still open containers are closed. It is preferred to perform such closing step by sealing, for example heat-sealing. Other embodiments refer to gluing a closing device on the open container, for example a polymer film, preferably a film made from water-soluble polymer.

In order to achieve sealing or heat-sealing of pouches, it is preferred to provide another polymer film and place it on the die containing the shaped film containing aqueous medium containing complexing agents (A).

In other embodiments wherein sachets of polymer film have been formed and at least partially filled with aqueous medium containing complexing agents (A) they may be closed by simply applying heat to the upper rim of the sachets, for example through a heated metal device. In other embodiments containers made from polymer film may be closed by performing a chemical reaction of a sealing substance. Said chemical reaction may be promoted by applying a vacuum.

In other embodiments, steps (b), (d) and (e) are performed as a vertical form-fill-seal route yielding envelope-shaped pouches that contain aqueous medium containing complexing agents (A).

The present invention is further illustrated by working examples.

The ee values were determined by HPLC using a Chirex 3126 column; (D)-penicillamine, 5 μm, 250×4.6 mm. The mobile phase (eluent) was 0.5 mM aqueous $CuSO_4$-solution. Injection: 10 μl, flow: 1.3 ml/min. Detection by UV light at 254 nm. Temperature: 20° C. Running time was 25 min. The ee value was determined as difference of the area % of the L- and D-MGDA peak divided by the sum of area % of L- and D-MGDA peak. Sample preparation: A 10 ml measuring flask was charged with 50 mg of test material and then filled mark with the eluent and then homogenized.

The solubility of polymer in water is determined is as follows: a pre-weighed 400 ml beaker is charged with 50 g±0.1 g of the respective polymer and 245 ml±1 ml of distilled water. The mixture so obtained is stirred by magnetic stirring for 30 minutes, ambient temperature, at 600 rounds per minute. The solution so obtained is filtered through a filtered qualitative sintered-glass filter with a maximum pore diameter of 20 μm. The water is removed from the filtrate by evaporation. The residue corresponds to the water-soluble portion. After drying at a temperature of 50° C. under vacuum the % solubility can be determined.

I. Syntheses of mixtures of MGDA and GLDA

Providing a Partially Neutralized Solution of L-Alanine and L-Glutamate

In a stirred reactor, 400.9 g (4.46 mol) L-alanine, 234.0 g (2.93 mol) sodium hydroxide as 50% solution in water and 832.2 g water were mixed at 70° C. Then, 665.2 g (3.55 mol) sodium L-glutamate monohydrate were added. The mixture was stirred at 60-70° C. until it was completely clear.

(c1-1) Strecker Reaction (Nitrile Synthesis)

The above described feed solution was used for the Strecker synthesis, which was conducted in a cascade of three stirred tank reactors.

The partially neutralized feed solution, formaldehyde as 30% aqueous solution, and HCN (80% of total amount) were added to a stirred reactor at 23-25° C. In a second stirred reactor additional HCN (20% of total amount) was added at 20° C. In a third stirred reactor at 20° C., the reaction was completed.

The reaction mixture obtained under steady state conditions was used as feed for the cold saponification.

(c2.1-1) Cold Saponification:

The cold saponification was conducted in a cascade of two stirred tank reactors and a tubular reactor. The temperature was approximately 55° C. in all reactors.

In a first stirred reactor, the feed solution and NaOH as 50% aqueous solution were added. For completion of the reaction, the mixture was further reacted in a second stirred tank reactor and in a tubular reactor.

The solution obtained under steady state conditions was used as feed in the hot saponification.

(c2.2-1) Hot Saponification:

The hot saponification was performed at 180° C. and 24 bar in a tubular plug flow reactor at 30 min retention time. The solution obtained under steady state conditions was stirred in a tank reactor at 970 mbar at 97° C. Then it was stripped in a wiped film evaporator at 900 mbar at 100° C. to further evaporate ammonia. Then, the concentration of total complexing agent (A) was adjusted to approximately 40 wt % (based on iron binding capacity).

The molar ratio of the feed materials was as follows:
L-alanine: 0.56
Sodium L-glutamate monohydrate: 0.44
Sodium hydroxide used for partial neutralization: 0.36
Formaldehyde: 1.97
HCN: 1.98
NaOH (sum of partial neutralization and NaOH added in cold saponification): 2.80

TABLE 1

Summary

| Example | Eq NaOH | T (nitrile synthesis) [° C.] | Retention time (hot saponification) [min] | MGDA-$Na_3$ [wt. %] | GLDA-$Na_4$ [wt. %] | ee (MGDA) [% ee] | Na formate [wt %] | pH value |
|---|---|---|---|---|---|---|---|---|
| I. | 2.80 | 23-25 | 30 | 20.3 | 19.1 | 39 | 0.5 | 10.6 |

The equivalents of NaOH refer to the sum of NaOH from the feed solution and NaOH addition during the cold saponification.
The wt % of sodium formate refer to the entire complexing agent (A).

The concentration of the solutions was raised by evaporation of water at 70° C. until the content of complexing agent (A) was 53% by weight, determined by measuring the iron binding capacity.

II. Manufacture of Inventive Pouches

Polyvinylalcohol films commercially available from MonoSol were used.

A polyvinylalcohol film, degree of saponification: 88 mole-%, thickness 38 µm, was cut into rectangular pieces of 12.5 cm each. Envelope-like pouches were made by folding the rectangular pieces accordingly. The brinks were connected by heat-sealing. With a pipette, 10 ml of 53% by weight solution of complexing agents (A) as obtained in example I. were placed into the envelope-like pouch. The pouch was closed again by heat-sealing. After 10 days of storage at ambient temperature, neither deterioration of the pouch nor disadvantageous change of the contents could be observed.

III. Manufacture of Detergent Compositions

Example detergent compositions according to Table 2 are prepared by mixing the respective ingredients in dry state.

TABLE 2

Example detergent compositions for automatic dishwashing

| All amounts in g/sample | ADW.1 | ADW.2 | ADW.3 |
|---|---|---|---|
| Protease | 2.5 | 2.5 | 2.5 |
| Amylase | 1 | 1 | 1 |
| n-$C_{18}H_{37}$—O($CH_2CH_2O$)$_9$H | 5 | 5 | 5 |
| Polyacrylic acid $M_w$ 4,000 g/mol as sodium salt, completely neutralized | 10 | 10 | 10 |
| Sodium percarbonate | 10.5 | 10.5 | 10.5 |
| TAED | 4 | 4 | 4 |
| $Na_2Si_2O_5$ | 2 | 2 | 2 |
| $Na_2CO_3$ | 19.5 | 19.5 | 19.5 |
| Sodium citrate dihydrate | 15 | 22.5 | 30 |
| HEDP | 0.5 | 0.5 | 0.5 |

Tablets may be formed of any of the above mixture, weight: 18 g, and one pouch from (II) may be placed on each tablet. The tablets are packed—together with the pouch—into a film of polyvinyl alcohol, degree of saponification: 88 mole-%, thickness: 35 µm. They may be used as unit doses in an automatic dishwasher and yield excellent dishwashing results. Their use is convenient.

The invention claimed is:

1. A container, comprising
a unit dose of a detergent composition containing at least two complexing agents (A) dissolved in an aqueous medium that is liquid or gel at ambient temperature, said complexing agents (A) being (A1) at least one alkali metal salt of methyl glycine diacetic acid and (A2) at least one alkali metal salt of glutamic acid diacetic acid,
wherein
a weight ratio of (A1) to (A2) ranges from 1:9 to 9:1,
the container is made from a polymer,
the aqueous medium comprises at least 25% by weight of water, relative to an entire liquid phase without the complexing agents (A1) and (A2),
a total amount of impurities selected from the group consisting of propionic acid, formic acid, glycolic acid, lactic acid, glutamate, alanine, nitrilotriacetic acid, and an alkali metal salt thereof ranges from 0.1 to 5% by weight, relative to a total amount of the complexing agents (A), and
the complexing agents (A1) and (A2) are partially neutralized with alkali.

2. The container according to claim 1, which comprises two or more compartments.

3. The container according to claim 1, wherein
the complexing agent (A1) contains an average of more than two and less than three of the carboxyl groups per molecule being neutralized with alkali, and
the complexing agent (A2) contains at least one alkali metal salt of L- and D-enantiomers of glutamic acid diacetic acid or of enantiomerically pure L- glutamic acid diacetic acid, with an average of more than three of the carboxyl groups per molecule being neutralized with alkali.

4. The container according to claim 1, which is in the form of a box with one or more compartments, or in the form of a sachet with one or more compartments, or in the form of a pouch with one or more compartments, or in the form of a combination of a box and a pouch.

5. The container according to claim 1, wherein the at least one complexing agent (A1) is a compound of formula (I):

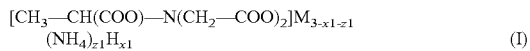

(I)

and
the at least one complexing agent (A2) is a compound of formula (II):

(II)

where
M is an alkali metal cation,
each x1 and z1 are in the range from 0.0 to 1.0 and a sum of x1+z1 is greater than zero but less than 1.0, and
each x2 and z2 are in the range from 0.0 to 1.0 and a sum of x2+z2 is less than 1.0.

6. The container according to claim 1, wherein the complexing agent (A1) is a mixture of L- and D-enantiomers of methyl glycine diacetic acid, and the mixture contains predominantly the respective L-isomer with an enantiomeric excess in the range of from 5 to 95%.

7. The container according to claim 1, wherein the container comprises at least two compartments, one compartment comprises the complexing agents (A) in the aqueous medium, and at least one further compartment contains a solid composition.

8. The container according to claim 1, wherein the aqueous medium comprises the complexing agents (A) in an amount ranging from 35 to 75% by weight.

9. The container according to claim 1, wherein the polymer is polyvinyl alcohol.

10. The container according to claim 1, wherein
the container comprises at least two compartments with one compartment comprising the aqueous medium comprising the complexing agents (A),
the detergent composition additionally comprises an inorganic peroxide, and
the inorganic peroxide is not in the compartment comprising the aqueous medium containing complexing agents (A).

11. The container according to claim 1, wherein the aqueous solution of the complexing agents (A) has a pH value ranging from 8.7 to 11.3.

12. The container according to claim 1, which is a container for dishwashing or laundry cleaning.

13. A process for making the container according to claim 1, the process comprising:

(a) shaping the polymer in a way so that the polymer has at least one recess to contain a liquid,
(b) providing the complexing agents (A1) and (A2) dissolved in the aqueous medium,
(c) placing the aqueous medium comprising the complexing agents (A1) and (A2) into the recess formed in (a), and
(d) closing the container.

14. The process according to claim 13, wherein (d) is performed by sealing.

15. The process according to claim 13, wherein (a) is performed with a forming die containing at least one cavity.

* * * * *